United States Patent [19]
Gordon

[11] Patent Number: 5,314,225
[45] Date of Patent: May 24, 1994

[54] SPORT TRUCK TOP

[75] Inventor: W. Dale Gordon, Scott County, Tenn.

[73] Assignee: Fleet Air Worldwide, Inc., Knoxville, Tenn.

[21] Appl. No.: 990,125

[22] Filed: Dec. 14, 1992

[51] Int. Cl.$^5$ .............................................. B60P 7/02
[52] U.S. Cl. ...................................... 296/10; 296/100; 296/156
[58] Field of Search ....................... 296/10, 100, 156

[56] References Cited

U.S. PATENT DOCUMENTS

| | | | |
|---|---|---|---|
| 3,857,601 | 12/1974 | Robbins | 296/10 |
| 4,799,726 | 1/1989 | Scott | 296/100 |
| 4,828,315 | 5/1989 | Muirhead | 296/99.1 |
| 4,877,283 | 10/1989 | Little et al. | 296/100 |
| 5,127,701 | 7/1992 | Miller | 296/100 |

Primary Examiner—Robert R. Song
Attorney, Agent, or Firm—Pitts & Brittian

[57] ABSTRACT

A replacement hard-top for a convertible sport truck or utility vehicle. The replacement top has a lightweight shell member and has at least one channel dimensioned to receive the vehicle's factory installed weather-seal in a tight frictional fit in order to form a weather-tight junction between said top and said body. The replacement top also has at least one notch, carried by the rear panels of the shell member, that is dimensioned to receive the vehicle's tail-gate when said tail-gate is in a closed position thus forming a weather-tight junction between said top and said tail-gate. This allows the replacement top to be interchangeable with the soft convertible top without replacing the factory installed weather-seal.

9 Claims, 4 Drawing Sheets

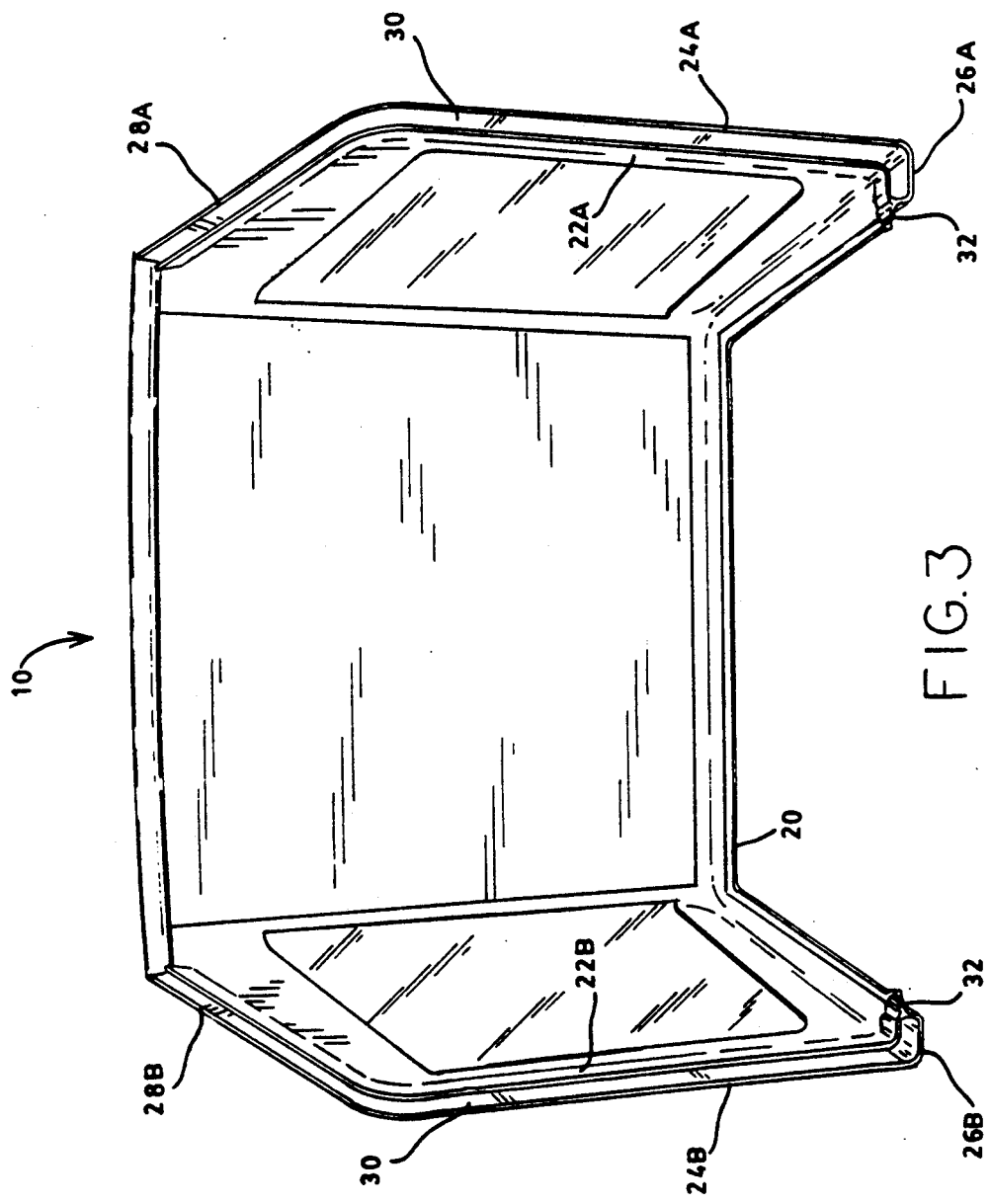

SPORT TRUCK TOP

TECHNICAL FIELD

This invention relates to the field of truck tops. More specifically it relates to a rigid top that can be interchanged with a sport truck's soft convertible top.

BACKGROUND ART

Many sport type truck and utility vehicles are provided with a canvas or similar material convertible top. A conventional soft convertible top has a factory installed weather-seal between the material of the convertible top and the body of the vehicle. This weather-seal is typically rubber and has a plurality of mounting points which serve to secure the convertible top to the body of the vehicle. It is often desirable to be able to replace the soft convertible top with a rigid hard-top. Conventionally, this requires removal of the factory installed weather-seal, which is replaced by a weather-seal suited particularly for the rigid hard-top. As the hard and soft tops are interchanged to suit the needs of the driver, these weather-seals lose their integrity as weather-seals and lose their effectiveness at providing a weather tight junction between the top and the body of the vehicle.

A similar problem is encountered at the junction of the tail-gate and the rearward lower edge of the hard-top. Some provision must be made for this junction to be weather-tight, or the driver is faced with a situation where the interior of the vehicle is unnecessarily exposed to wind and moisture.

Accordingly, it is an object of this invention to provide a hard-top for a sport truck or utility vehicle to serve as an interchangeable replacement for the sport vehicle's factory installed soft convertible top.

It is another object of the present invention to provide a replacement hard-top for a sport truck or utility vehicle which can be installed over the vehicle's existing, factory installed weather-seals.

Still another object of the present invention is to provide a replacement hard-top for a sport truck or utility vehicle which allows a weather-tight junction between the vehicle's tail-gate and the replacement hard-top.

Other objects and advantages over the prior art will become apparent to those skilled in the art upon reading the detailed description together with the drawings as described as follows.

DISCLOSURE OF THE INVENTION

In accordance with the various features of this invention, a replacement hard-top for a sport truck or similar utility vehicle is provided which can be replaceably interchanged with the sport vehicle's soft convertible top. The replacement hard-top is provided with a channel which mounts directly on the factory installed weather-seal, thus allowing for a weather-tight junction between the replacement hard-top and the body of the sport vehicle. The replacement hard top is also provided with a recess which receives the vehicle's tailgate and maintains the integrity of the weather-tight junction, thus preventing exposure of the interior of the sport vehicle to wind and moisture at the junction of the tailgate and the replacement hard-top.

BRIEF DESCRIPTION OF THE DRAWINGS

The above mentioned features of the invention will become more clearly understood from the following detailed description of the invention read together with the drawings in which:

FIG. 3 illustrates a bottom plan view of the top of the present invention.

BEST MODE FOR CARRYING OUT THE INVENTION

Figure 1:
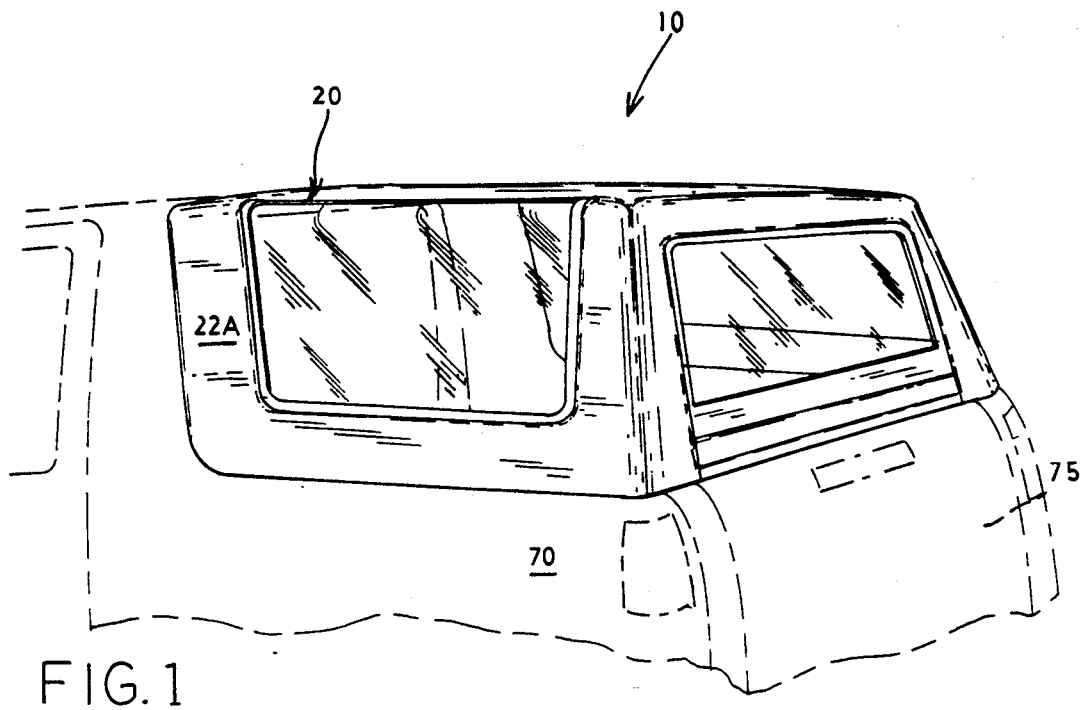
FIG. 1 illustrates a perspective view of the sport truck top of the present invention in place on a sport type truck (shown in phantom).
Figure 2:
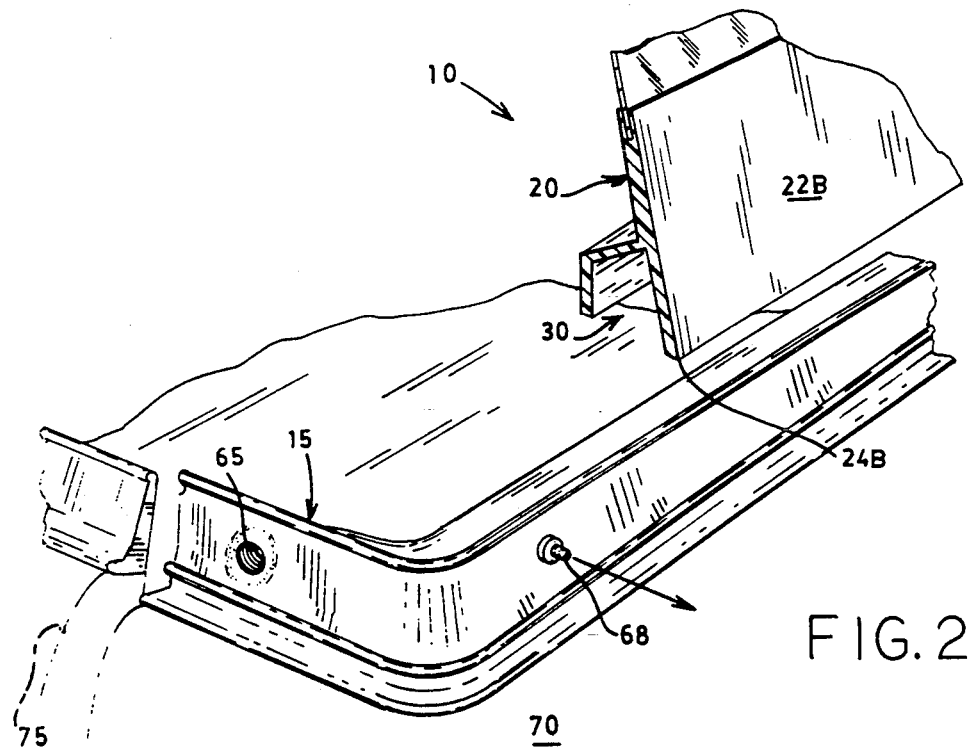
FIG. 2 illustrates a partial view in perspective showing the top of the present invention, in partial section, in position above the truck's factory installed weather-seal.
Figure 5:
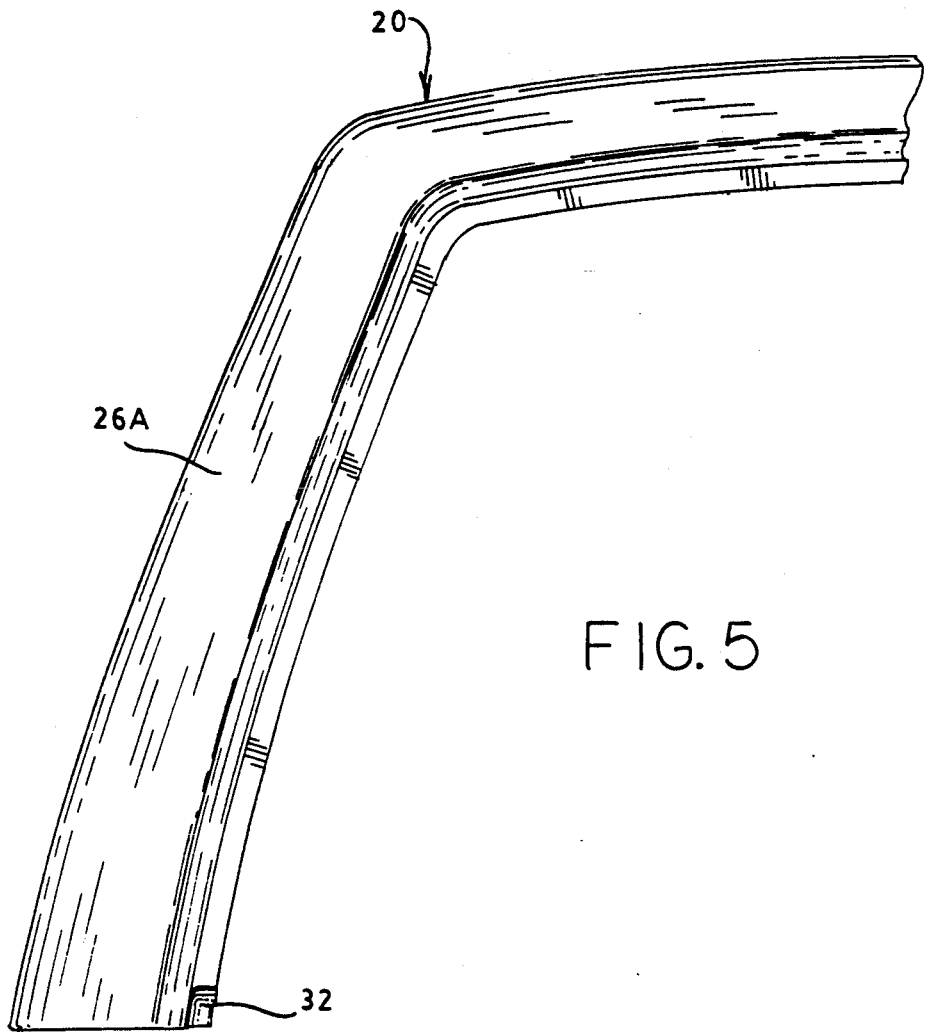
FIG. 5 illustrates a partial rear elevation thereof.
Figure 4:
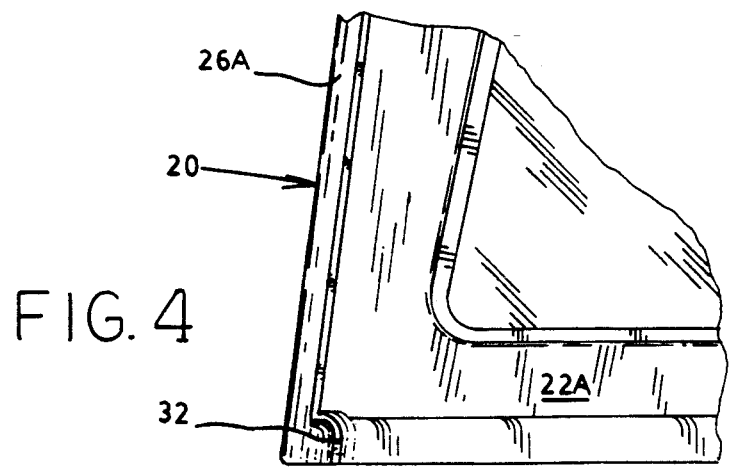
FIG. 4 illustrates a partial right side elevation view thereof.
Figure 6:
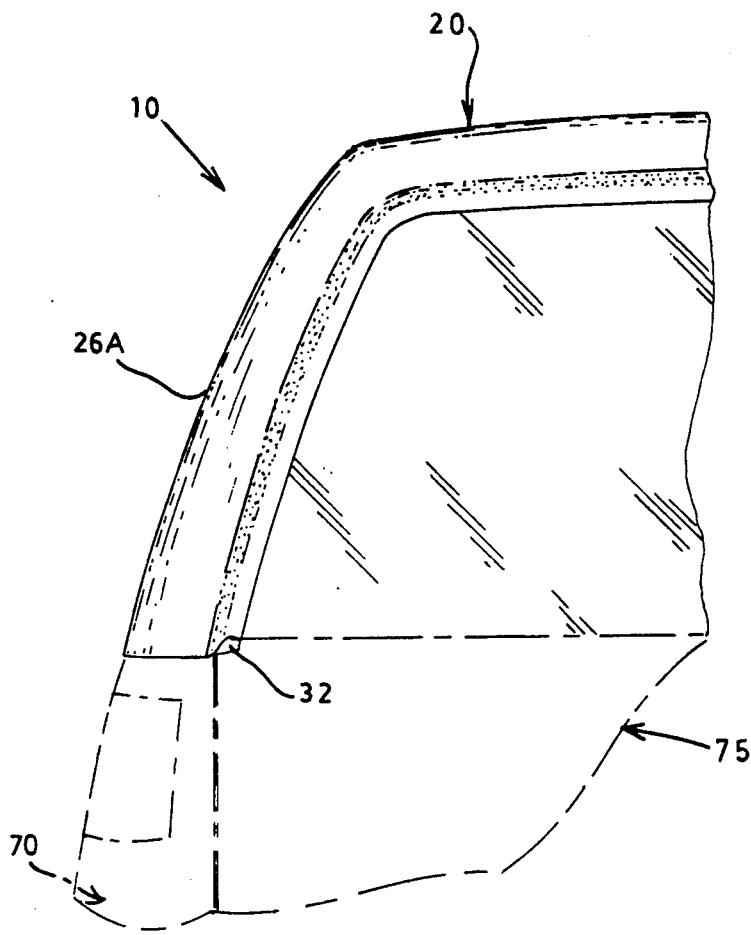
FIG. 6 illustrates a partial rear elevation of the the top as in FIG. 5 showing the truck body and tailgate in phantom.
Figure 7:
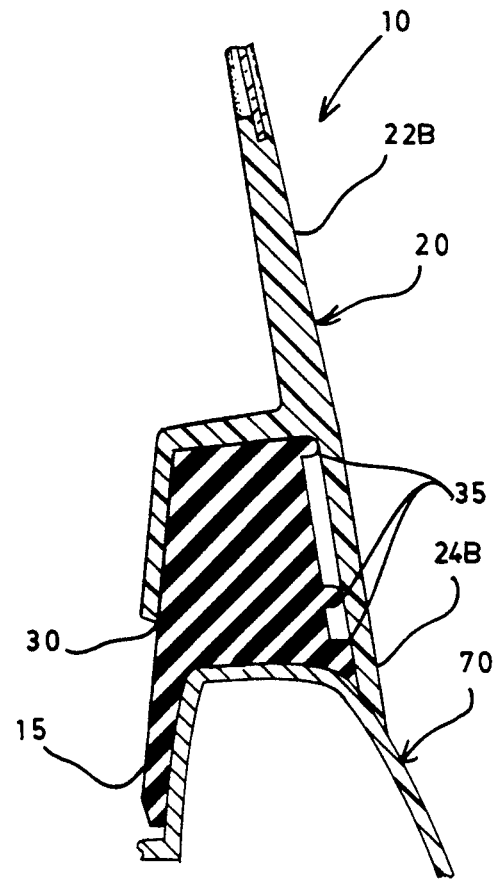
FIG. 7 illustrates a cross-sectional view of the top of the present invention and the existing truck body and weather-seal.

A replacement top, for a convertible vehicle such as a sport truck or other sport-type utility vehicle, constructed in accordance with the present invention is shown generally as 10 in the figures. Many of the popular sport-type utility vehicles have a soft convertible top (not shown), some type of tail-gate 75 (shown in phantom) and a factory installed weather-seal 15 for forming a weather-tight junction between the body 70 (shown in phantom) and the soft convertible top. Conventionally, weather-seal 15 carries a plurality of hole defining members 65 each of which releasably receives a securing means 68 for securing the soft convertible top to weather-seal 15.

Top 10 has a shell member 20 which is preferably fabricated of a rigid material, more preferably a lightweight, rigid material and most preferably fiberglass. Shell member 20 has first and second sides 22A and 22B respectively. First and second sides have first and second lower edges 24A and 24B respectively, first and second front edges 28A and 28B respectively and first and second rear panels 26A and 26B respectively.

Lower edges 24A and 24B are in association with channel 30. Preferably, lower edges 24A and 24B form a portion of channel 30, however it will be recognized that lower edges 24A and 24B could alternatively carry channel 30. Channel 30 is dimensioned to receive weather-seal 15 in a tight frictional fit thereby forming a weather-tight junction 35 between top 10 and body 70. It will be appreciated by those skilled in the art that there are several manufacturers of sport trucks and other sport-type utility vehicles with soft convertible tops. These different vehicles will have factory installed weather-seals that have different configurations and different dimensions. The present invention is not to be limited to the specific configuration shown and described, but rather it is intended that the present invention could be readily configured to suit any sport-type utility vehicle with a soft convertible top and an associated weather-seal. It will also be recognized that the top of the present invention will be releasably secured to a sport type truck by conventional means.

Many of the convertible sport-type utility vehicles, the soft convertible top of which the present invention is intended to interchangeably replace have a continuous weather-seal that seals between the soft convertible top and the portion of the body immediately behind the cab of the vehicle. In the preferred embodiment, channel 30 extends the length of lower edges 24A and 24B and continues the length of front edges 28A and 28B.

Channel 30 allows top 10 to be used in conjunction with the vehicle's factory installed weather-seal 15, thus eliminating the necessity of removing and reaffixing a weather-seal as one changes tops. Thus the integrity of weather-seal 15 is maintained as well as the integrity of the bond between weather-seal 15 and body 70 and concomitantly, the ability of weather-seal 15 to prevent exposure of the interior of the vehicle to wind and moisture is maintained.

Top 10 additionally has notches 32 carried by rear panels 26A and 26B of shell member 20 notches 32 are dimensioned to receive tail-gate 75 tail-gate 75 is in a closed position thereby forming a weather-tight junction between said top and tail-gate 75.

In order to replace the vehicle's soft convertible top with top 10, the soft convertible top is first removed. Securing means 68 are all removed from weather-seal 15. Securing means 68 are then stored so as to be reused in the event that the user wishes to reinstall the vehicle's soft convertible top. Top 10 is then lowered such that channel 30 receives weather-seal 15 in a tight frictional fit, thus forming a weather-tight junction 35 between top 10 and weather-seal 15.

From the foregoing description, it will be recognized by those skilled in the art that a replacement top, for a convertible vehicle such as a sport truck or other sport-type utility vehicle, offering advantages over the prior art has been provided. Specifically, the replacement top provides a hard-top for a sport truck or other sport-type utility vehicle to serve as an interchangeable replacement for the sport vehicle's factory installed soft convertible top. This is achieved by providing a replacement hard-top which can be installed over the vehicle's existing, factory installed, weather-seals. This preserves the integrity of the weather-seal by eliminating the necessity of replacing the factory installed weather-seal with a weather-seal specifically configured for conventional replacement hard-tops. The replacement hard-top of the present invention also provides a weather-tight junction between the vehicle's tail-gate and the replacement hard-top.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, I claim:

1. A top for a convertible vehicle, wherein said convertible vehicle has a body, a soft convertible top, a tail-gate and a conventional weather-seal mounted on the body for forming a weather-tight junction between the body and the soft convertible top, said top comprising:
   a shell member having first and second sides, said first and second sides having first and second lower edges, first and second front edges and first and second rear panels; and
   at least one channel carried by said lower edges of said shell member wherein said channel is dimensioned to receive the conventional weather-seal in a tight frictional fit thereby forming a weather-tight junction between said top and the body of the convertible vehicle.

2. The top of claim 1 wherein said channel is additionally carried by said front edges.

3. The top of claim 1 wherein said shell member is fabricated of a rigid material.

4. The top of claim 1 wherein said top additionally comprises notches carried by said rear panels of said shell member, wherein said notches are dimensioned to receive the tail-gate when the tail-gate is in a closed position thereby forming a weather-tight junction between said top and the tail-gate.

5. A top for a convertible vehicle, wherein said convertible vehicle has a body, a soft convertible top, a tail-gate and a conventional weather-seal mounted on the body for forming a weather-tight junction between the body and the soft convertible top, said top comprising:
   a shell member having first and second sides, said first and second sides having first and second lower edges, first and second front edges and first and second rear panels; and
   at least one channel carried by said lower edges and by said front edges of said shell member wherein said channel is dimensioned to receive the conventional weather-seal in a tight frictional fit thereby forming a weather-tight junction between said top and the body of the convertible vehicle.

6. The top of claim 5 wherein said shell member is fabricated of a lightweight rigid material.

7. The top of claim 5 wherein said top additionally comprises notches carried by said rear panels of said shell member, wherein said notches are dimensioned to receive the tail-gate when the tail-gate is in a closed position thereby forming a weather-tight junction between said top and the tail-gate.

8. A top for a convertible vehicle, wherein said convertible vehicle has a body, a soft convertible top, a tail-gate and a conventional weather-seal mounted on the body for forming a weather-tight junction between body and the soft convertible top, said top comprising:
   a shell member having first and second sides, said first and second sides having first and second lower edges, first and second front edges and first and second rear panels;
   at least one channel carried by said lower edges and by said front edges of said shell member wherein said channel is dimensioned to receive the conventional weather-seal in a tight frictional fit thereby forming a weather-tight junction between said top and the body; and
   at least one notch carried by each of said rear panels of said shell member, wherein said notches are dimensioned to receive the tail-gate when the tail-gate is in a closed position thereby forming a weather-tight junction between said top and the tail-gate.

9. The top of claim 8 wherein said shell member is fabricated of fiberglass.

* * * * *